(12) United States Patent
Cook et al.

(10) Patent No.: US 10,511,645 B2
(45) Date of Patent: *Dec. 17, 2019

(54) DYNAMIC STREAM OPERATOR FISSION AND FUSION WITH PLATFORM MANAGEMENT HINTS

(71) Applicant: International Business Machines Corporation, Armonk, NY (US)

(72) Inventors: Alexander Cook, Rochester, MN (US); Cory J. Kleinheksel, Ames, IA (US); David M. Koster, Rochester, MN (US); Peter A. Nicholls, Janetville (CA); Jason A. Nikolai, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/688,518

(22) Filed: Aug. 28, 2017

(65) Prior Publication Data

US 2017/0359395 A1 Dec. 14, 2017

Related U.S. Application Data

(63) Continuation of application No. 15/151,020, filed on May 10, 2016.

(51) Int. Cl.
*G06F 16/2453* (2019.01)
*H04L 29/06* (2006.01)
(Continued)

(52) U.S. Cl.
CPC .......... *H04L 65/4069* (2013.01); *G06F 8/456* (2013.01); *G06F 9/5066* (2013.01);
(Continued)

(58) Field of Classification Search
CPC ..... G06F 8/45; G06F 9/46; G06F 9/48; G06F 9/485; G06F 9/5038; G06F 9/5066;
(Continued)

(56) References Cited

U.S. PATENT DOCUMENTS 7,529,752 B2 5/2009 Hinshaw et al.
8,560,602 B2 10/2013 Andrade et al.
(Continued)

OTHER PUBLICATIONS

Gordon et al.; "Exploiting Coarse-Grained Task, Data, and Pipeline Parallelism in Stream Programs"; ASPLOS'06 Oct. 21-25, 2006; San Jose, California, USA. pp. 151-162.
(Continued)

*Primary Examiner* — Dustin Nguyen
(74) *Attorney, Agent, or Firm* — Mollborn Patents, Inc.; Fredrik Mollborn

(57) ABSTRACT

Methods for data stream processing in a runtime data processing environment. A stream processing graph that includes several connected operators is received. Source code of the operators is analyzed to identify hints describing whether an operator contains data structures, method parameters or other data that can be applied in a parallelization data processing environment. Performance metrics of the data processing environment within parallel regions is evaluated to determine whether data processing resources can be dynamically scaled up or down. In response to determining that the data processing resources can be dynamically scaled up, one or more operators are split to be processed on two or more parallel processing resources. In response to determining that the data processing resources can be dynamically scaled down, one or more operators are combined to be processed on a single parallel processing resource.

5 Claims, 5 Drawing Sheets

(51) Int. Cl.
*G06F 16/901* (2019.01)
*G06F 9/50* (2006.01)
*G06F 8/41* (2018.01)

(52) U.S. Cl.
CPC .. *G06F 16/24532* (2019.01); *G06F 16/24537* (2019.01); *G06F 16/9024* (2019.01); *H04L 65/80* (2013.01)

(58) Field of Classification Search
CPC ........ G06F 17/30516; G06F 8/20; G06F 8/30; G06F 8/451; G06F 9/44; G06F 9/4887; G06F 16/24568; G06F 8/456; G06F 16/24532; G06F 16/24535; H04N 19/89; H04L 12/6418; H04L 65/60; H04L 65/601
See application file for complete search history.

(56) References Cited

U.S. PATENT DOCUMENTS

| | | | | |
|---|---|---|---|---|
| 9,569,178 | B1* | 2/2017 | Barsness | G06F 8/20 |
| 9,648,068 | B1* | 5/2017 | Narsude | H04L 65/60 |
| 10,303,695 | B2* | 5/2019 | Deshmukh | G06F 16/24535 |
| 2006/0218123 | A1* | 9/2006 | Chowdhuri | G06F 16/24532 |
| 2006/0230174 | A1* | 10/2006 | Hoche | H04N 19/89 709/231 |
| 2007/0124732 | A1* | 5/2007 | Lia | G06F 9/485 718/102 |
| 2007/0250470 | A1* | 10/2007 | Duffy | G06F 16/24532 |
| 2008/0133891 | A1* | 6/2008 | Salz | G06F 8/30 712/220 |
| 2009/0300615 | A1* | 12/2009 | Andrade | G06F 9/5066 718/100 |
| 2009/0313614 | A1* | 12/2009 | Andrade | G06F 8/451 717/151 |
| 2011/0061060 | A1* | 3/2011 | Andrade | G06F 9/5066 719/313 |
| 2012/0179809 | A1* | 7/2012 | Barsness | G06F 17/30516 709/224 |
| 2013/0091507 | A1* | 4/2013 | Wu | G06F 9/5038 718/104 |
| 2013/0198318 | A1* | 8/2013 | Branson | G06F 9/44 709/217 |
| 2013/0290969 | A1* | 10/2013 | Branson | G06F 9/48 718/102 |
| 2013/0298130 | A1* | 11/2013 | Pienaar | G06F 9/4887 718/102 |
| 2014/0040237 | A1* | 2/2014 | Chen | G06F 16/24568 707/722 |
| 2014/0040915 | A1 | 2/2014 | Chen et al. | |
| 2014/0059212 | A1* | 2/2014 | Gedik | G06F 9/5066 709/224 |
| 2014/0068578 | A1* | 3/2014 | Gedik | G06F 8/456 717/143 |
| 2014/0196017 | A1* | 7/2014 | Halim | G06F 8/45 717/149 |
| 2014/0304545 | A1* | 10/2014 | Chen | G06F 9/46 714/4.3 |
| 2014/0359271 | A1* | 12/2014 | Gedik | H04L 12/6418 713/100 |
| 2015/0149507 | A1* | 5/2015 | Imaki | G06F 16/24568 707/798 |
| 2018/0198730 | A1* | 7/2018 | Cook | H04L 65/601 |

OTHER PUBLICATIONS

IBM "What is MapReduce?" <https://www-01.ibm.com/software/data/infosphere/hadoop/mapreduce/> Downloaded Nov. 18, 2015. 3 pp.

Schneider, et al; "Auto-Parallelizing Stateful Distributed Streaming Applications"; PACT'12, Sep. 19-23, 2012; Minneapolis, Minnesota, USA. pp. 53-63.

Wu et al; "Optimizing DataWarehousing Applications for GPUs Using Kernel Fusion/Fission"; 2012 IEEE 26th International Parallel and Distributed Processing Symposium Workshops & PhD Forum; Shanghai; May 21-25, 2012; 10 pp.

List of IBM Patents or Patent Applications Treated as Related.

* cited by examiner

DYNAMIC STREAM OPERATOR FISSION AND FUSION WITH PLATFORM MANAGEMENT HINTS

BACKGROUND

The present invention relates to data processing, and more specifically, to processing data streams. Data stream processing is typically referred to as the in-memory, record-by-record analysis of machine data in motion. A common objective of data stream processing is to extract actionable intelligence as streaming analytics, and to react to operational exceptions through real-time alerts and automated actions in order to correct or avert the problem. The data streams that are processed are typically unstructured log records and sensor events, with each record including a timestamp indicating the exact time of data creation or arrival.

Over the past few years, there has been a significant increase in machine-generated data from logs, sensors, networks and devices, which has led to an exponential increase in data volume. This increase has been happening in parallel with a developing need for real-time so-called "Big Data" applications, as enterprises typically want to extract greater value from their real-time Big Data asset.

However, applications based on traditional "store-first, process-second"-data management architectures are unable to scale for real-time Big Data applications, primarily due to the latency and throughput requirements for real-time applications in industries such as telecom, Internet of Things (IOT) and cyber-security.

Data stream processing, on the other hand, is a programming paradigm that naturally exposes task and pipeline parallelism. Streaming applications are directed graphs where vertices are operators and edges are data streams. Because the operators are independent of each other, and are fed continuous streams of tuples, they can naturally execute in parallel. The only communication between operators is through the streams that connect them. When operators are connected in chains, they expose inherent pipeline parallelism. When the same streams are fed to multiple operators that perform distinct tasks, they expose inherent task parallelism. This makes them popular in environments where high throughput, low latency applications are required that can scale with both the number of cores in a machine, and with the number of machines in a cluster.

While pipeline and task parallelism occur naturally in stream graphs, data parallelism requires intervention. In the streaming context, data parallelism involves splitting data streams and replicating operators. The parallelism obtained through replication can be more well balanced than the inherent parallelism in a particular stream graph, and is easier to scale to the resources at hand. Such data parallelism allows operators to take advantage of additional cores and hosts that the task and pipeline parallelism are unable to exploit.

Extracting data parallelism by hand is possible, but is usually cumbersome. Developers must identify where potential data parallelism exists, while at the same time considering if applying data parallelism is safe. The difficulty of developers doing this optimization by hand grows quickly with the size of the application and the interaction of the subgraphs that comprise it. After identifying where parallelism is both possible and legal, developers may have to enforce ordering on their own. All of these tasks are tedious and error-prone. Further, unless an operator was explicitly written as a parallel or threaded operator, it may not be clear how to add processing resources. Yet further, explicitly creating parallel operator regions when volume or velocity of data is low is a waste of resources, especially in a cloud setting. Thus, there is a need for improved data stream processing techniques.

SUMMARY

According to one embodiment of the present invention, methods are provided for data stream processing in a runtime data processing environment. A stream processing graph that includes several connected operators is received. Source code of the operators is analyzed to identify hints describing whether an operator contains data structures, method parameters or other data that can be applied in a parallelization data processing environment. Performance metrics of the data processing environment within parallel regions is evaluated to determine whether data processing resources can be dynamically scaled up or down. In response to determining that the data processing resources can be dynamically scaled up, one or more operators are split to be processed on two or more parallel processing resources. In response to determining that the data processing resources can be dynamically scaled down, one or more operators are combined to be processed on a single parallel processing resource.

The details of one or more embodiments of the invention are set forth in the accompanying drawings and the description below. Other features and advantages of the invention will be apparent from the description and drawings, and from the claims.

BRIEF DESCRIPTION OF THE DRAWINGS

Like reference symbols in the various drawings indicate like elements.

DETAILED DESCRIPTION

Figure 1:
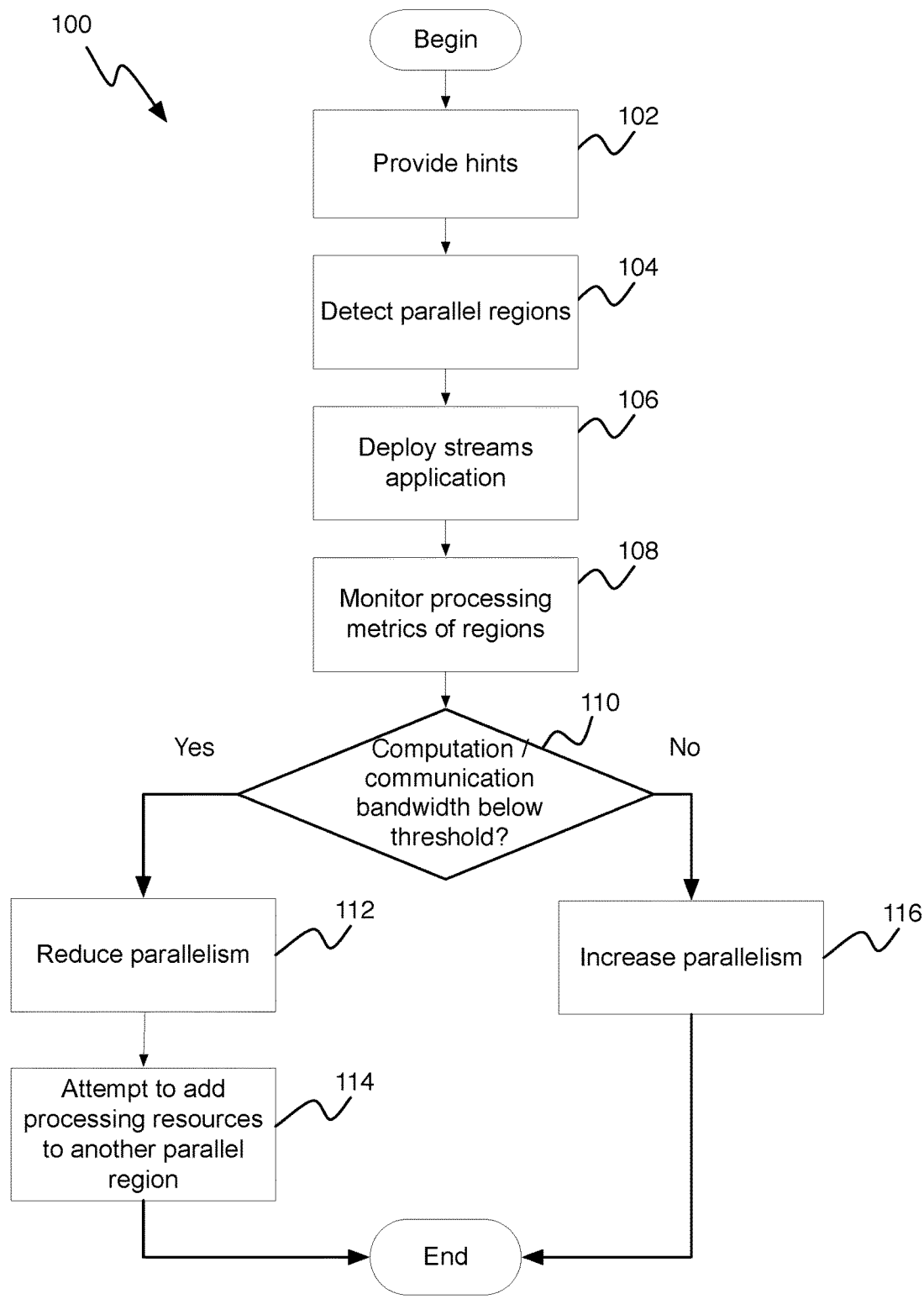
FIG. 1 shows a flowchart 100 for data stream processing, in accordance with one embodiment.

The various embodiments of the invention pertain to techniques for addressing the challenges mentioned above by using hints to the platform runtime management as to where and how to decide to scale up or scale down resources.

In the following description, the concepts of "fission" and "fusion" within a streams application will be used. Stream processing graphs are composed of a connected graph of operators, which are code blocks that are capable of independently running in a process, for example a Linux process.

Operator fusion refers to placing multiple operators together into a single process, such that they pool network I/O and process tuples as a single unit.

Operator fission refers to the opposite of this process, wherein multiple operators that have been deployed in a single process are split into two or more processes (potentially on different resources) and each process is allocated its own I/O resources, thus allowing the operators to process tuples independently of each other.

Operator parallelization is a concept that is similar to operator fission. When there is a desire to split any given operator in the graph into two operators for higher processing rates, and the operator is deployed as a single operator, the operator is cloned. That is, the same code block is deployed in a process, to another resource. Then the connections that feed into the original operator are directed to split their data flow between the two identical operator deployments.

In order to further illustrate the concepts of operator fusion, fission and parallelization, please consider the following example. Assume that there is a complex algorithm with multiple operators A, B, C, and D. In a fusion example, the operator management may decide for numerous reasons that ABC should be one process and D should be another process. In a fission example, it may be decided that the combined ABC process should be split into two or more processes, say an AB process and a C process, for example. Operator parallelization, on the other hand, is even at a finer level than this. Here operator D already has its own process, but it is determined that for numerous reasons the process could benefit from additional parallelization. Therefore, operator D is split into two or more operators in two or more processes, say process D1 and D2. Thus, the results of these examples are processes AB, C, D1 and D2.

In accordance with some embodiments of the invention, hints are used within the source code of the streams graphs and the operators contained in those graphs to apply parallel regions on specific data structure(s), method parameter(s), and potentially other data or functional parallel items.

Further, in some embodiments, resources are scaled up or down dynamically during runtime, based on performance metrics within parallel regions. Many streams engines, such as, for example the Infosphere Streams, which is available from International Business Corporation of Armonk, N.Y., collect complex metrics on various aspects of the engine's runtime. This monitoring is provided by the engine and then used for various purposes during operation. Many such techniques are familiar to those of ordinary skill in the art. As will be described in further detail below, scaling up or down may involve fission, fusion or parallelization of operators. In some cases, fusion opportunities may also arise from prior fission of operators, as described in the example above.

While data parallel processing may be easily understood, an example of a hint at functional parallel opportunities may be a hint above an implementation of code relying on a series of "if" or "switch" statements, to which fission could be applied as a way to create similar (but different) functional parallel items. In the various embodiments, these hints can either be expressed directly in the source code as annotations or in some cases they may be implicit.

As the skilled person realizes, explicit hints using in-code annotations near "if" or "switch" statements could be just one method that a developer can use to hint to the management engine of a possible place in the execution to perform the splitting. Thus, there might be several conditions, and each of those conditions may then become their own copy of the operator after the parallelization split occurs.

Implicit hints, on the other hand, come from algorithm and data structure fundamentals. Implicit hints can include, for example, streaming operators whose processing is dependent upon a hash table or hash map, which through code analysis or other means can be determined to be well suited for isolated/independent processing.

With reference now to FIG. 1, a schematic process 100 is shown for data stream processing, in accordance with one embodiment. As can be seen in FIG. 1, the process 100 starts by a developer providing hints to the streams to use at runtime, during development in step 102. As was described above, these hints can be implicit, for example, like "partitionBy" parameters. Alternatively, the hints can be more explicit, such as a Java™ annotation indicating that a particular Java™ hash table can be parallelized or that a particular Java™ method can be parallelized on a particular parameter(s).

Next, during compile time, the compiler identifies parallel regions in step 104. The parallel regions can include known safe potential parallel regions. Safe regions are regions that through static analysis are guaranteed to have the ability to parallelize without the need of a hint in the source code. There may also be additional potential parallel regions within the source code, which could not have been automatically detected without the additional hints in the source code. As was described above, a hint may be needed, for example, to identify areas of source code to which fission could be applied to create functionally different parallel operators, i.e., a set of "if" or "switch" statements.

Next, during runtime, the streams application is initially deployed in such a way that all parallel regions defined in step 104 are as wide as possible. For regions to be "wide" in this context refers to that all the resources allocated to the streams job will be consumed. Thus, parallel regions will be replicated a number of times in order to generate process to match all physical resources allocated. As a result, each region is given approximately the same level of parallelism, step 106.

The processing metrics of all of these regions are automatically monitored on a periodic basis during runtime, step 108. The period between re-evaluating metrics can be variable, from a few milliseconds (i.e., in essence continuous) to longer time periods. For example, the period can be based on a period of time or on a certain number of tuples processed. Further, in some embodiments, there can be "exceptional thresholds" programmed that induce immediate re-evaluation, for example, in response to detecting 100% usage, or detecting that a tuple queue has reached a specific depth.

The process examines whether a region is using computation and communication bandwidths below a certain threshold in step 110. In various embodiments, the thresholds can be singular values or can be a set of values. With single thresholds, changes to the system may occur each time the metric passes above or below the value. Sets of threshold values may be used when different actions may want to be taken at each level. For example to avoid so-called thrashing of the system (i.e., when the management of a computation begins to consume more resources than the computation itself), it may be beneficial to scale down a parallel region at 20% usage, but not attempt to scale up the region until the usage crosses 60%.

If it is determined in step 110 that the region uses below the threshold, its degree of parallelism is reduced in step 112. In some embodiments, reducing the parallelism may also involve fusing the region with other operators or regions. Processing resources are not immediately returned, but first an attempt is made in step 114 to add the processing resources to another parallel region, and the process 100 ends.

If it is determined in step 110 that a region uses computation and communication bandwidths above a certain threshold, its degree of parallelism is increased in step 116. This increase is typically constrained by resource availability and by the runtime limitations. For example, a runtime limitation may be that "partitionBy," or hash table, or other parallel defined regions simply will not benefit from additional resources. For example, if a there are only four "if" conditions and there are already four parallel operators responsible for one condition each, then adding a fifth parallel operator will have no impact because there is no work that can be assigned to that operator.

The scaling up or scaling down of a parallel region by adding and removing resources experiences different challenges when faced with stateless or stateful regions, as well as with the availability of "spare" resources or not. "Stateful" in this context implies that stream tuples that have arrived in the past affect the processing of a tuple that arrives in the future. "Stateless" implies that regardless of the order of the tuples, every incoming tuple will always generate the same output even when the order is changed. So past tuples do not have an impact on future tuples. Certain conditions make it easier to perform this scaling. The specific details on live vs. halted operator/region migration and scaling is well-known to those of ordinary skill in the art, and no further description is believed to be necessary here.

Figure 2A:
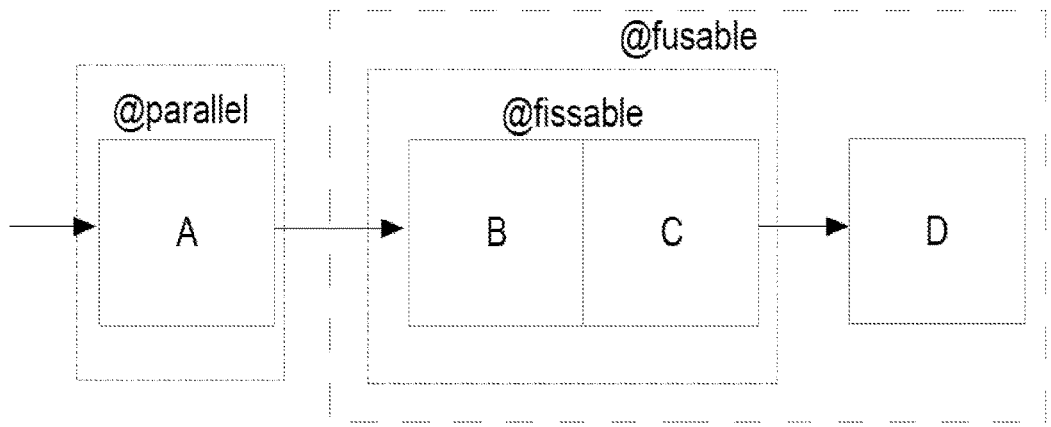
FIG. 2A-2G show schematic block diagrams of various scenarios that can occur as the operator load changes in a data stream processing system, in accordance with one embodiment.

FIGS. 2A-2G show schematic views of a range of possible examples in which fission, fusion and parallelization can be applied, as discussed above. Turning now to FIG. 2A, four operators A, B, C and D are show with hints as written in their source code. Operator A is an operator that can be parallelized. Operators B, C and D are operators that are fusible, and among these operators, operators B and C form one fissable unit.

Figure 2B:
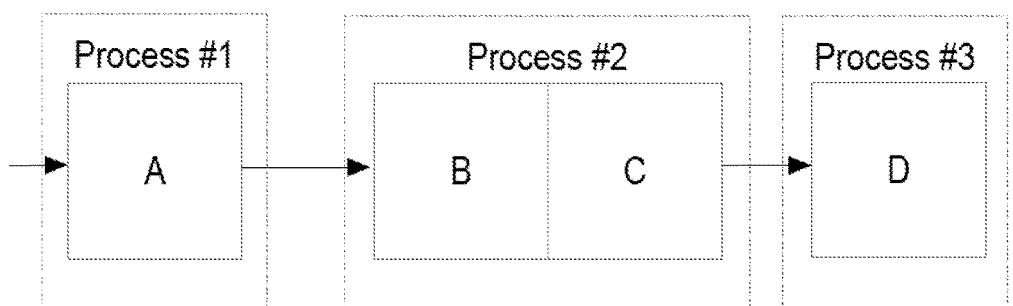

FIG. 2B illustrates the default or initial system deployment. As can be seen in FIG. 2B, a first process, Process #1, is deployed on operator A. A second process, Process #2, is deployed on the B and C operators. A third process, Process #3, is deployed on operator D.

Figure 2C:
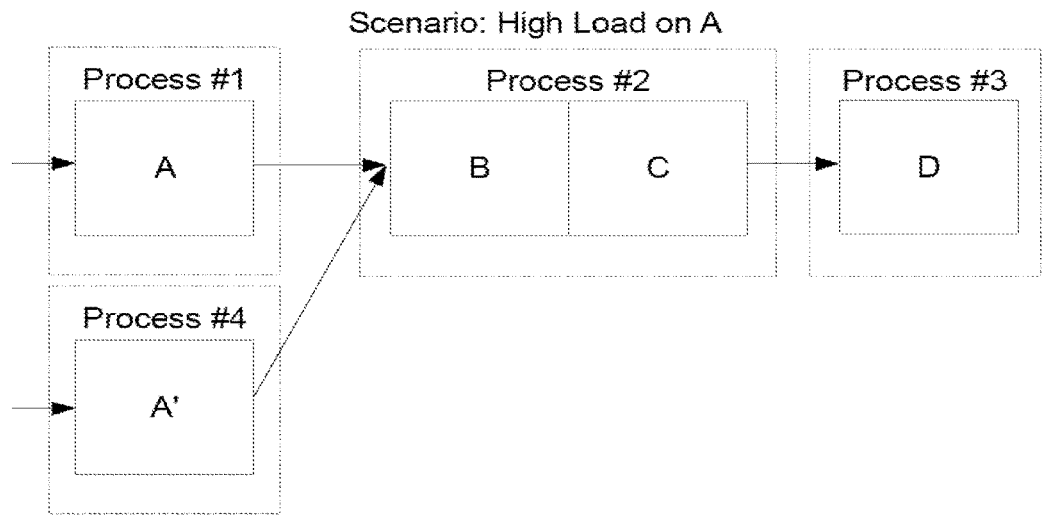

Assume now that there is a high load on operator A. This scenario is illustrated in FIG. 2C. Since operator A has the ability to be parallelized, the system "clones" operator A into an identical deployment, operator A'. This enables the original incoming data stream to operator A to be split between operator A and operator A', which is illustrated in FIG. 2C as Process #4.

Figure 2D:
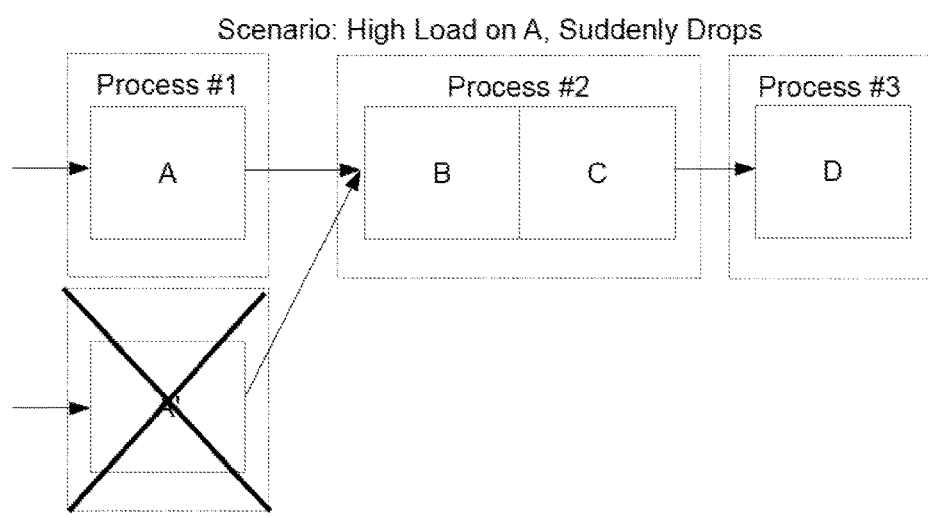

FIG. 2D shows the opposite scenario, that is, when the load on operators A and A' suddenly drops. In that case, operator A' is deleted by the system and all its tasks are resumed by operator A, as was originally the case.

Figure 2E:
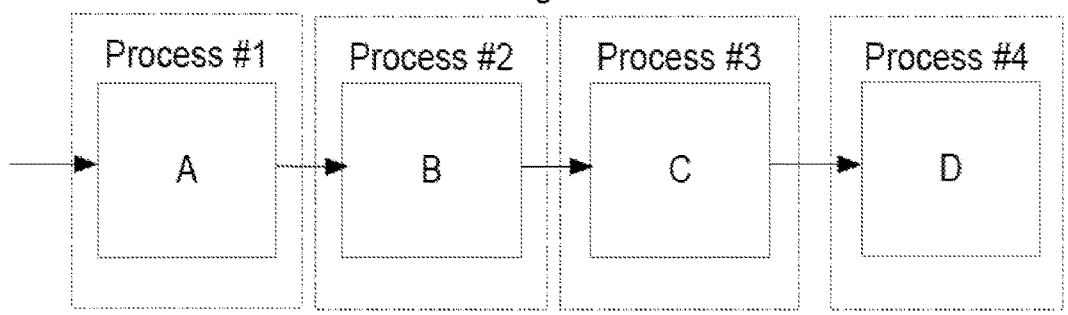

FIG. 2E shows a scenario in which there is a high load on operator B. Since operators B and C are fissable, operators B and C are split into two processes, Process #2 and Process #3 (potentially on different resources), and each process is allocated its own I/O resources, thus allowing operators B and C to process tuples independently of each other.

Figure 2F:
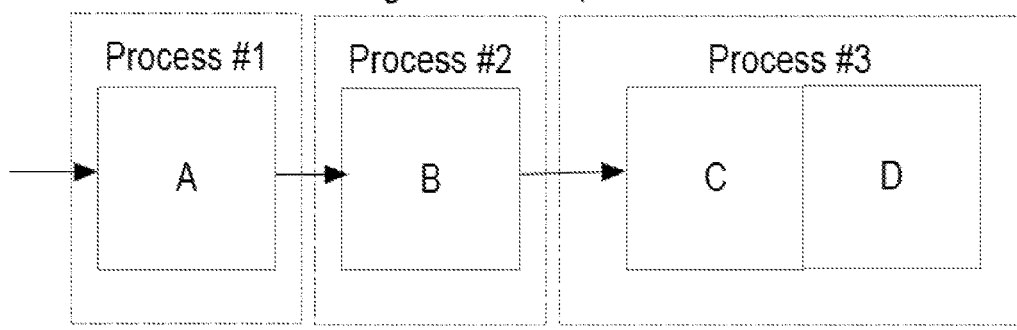

FIG. 2F shows a scenario in which two operators are fused. In this case, it is assumed that there is a high load on operator B and a low load on each of operators C and D. Since operators C and D are fusible, they are placed together into a single process, Process #3, and will thus pool network I/O and process tuples as a single unit.

Figure 2G:
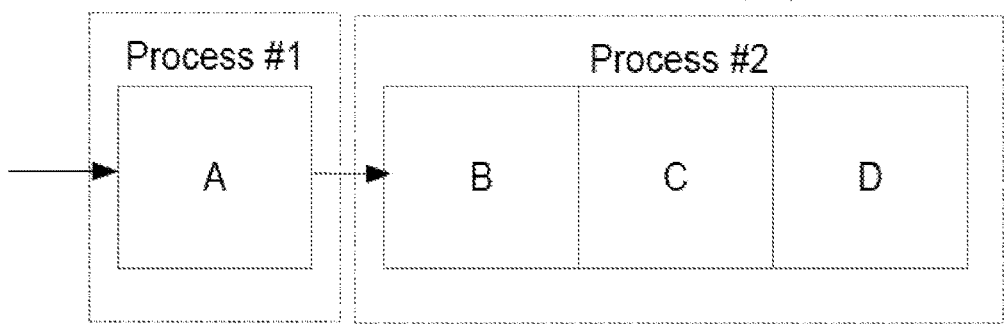

Lastly, FIG. 2G shows a scenario in which three operators are fused. In this case, it is assumed that there is a low load on each of operators B, C and D. Since all of these operators are fusible, they are placed together into a single process, Process #2, and will thus pool network I/O and process tuples as a single unit.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for data stream processing in a runtime data processing environment, comprising:
   receiving a stream processing graph comprising a plurality of connected operators;
   analyzing source code of the plurality of operators to identify explicit hints describing whether an operator contains data structures, method parameters or other data that can be applied in a parallelization data processing environment;
   evaluating performance metrics of the data processing environment within parallel regions on a periodic basis during runtime to determine whether data processing resources can be dynamically scaled up or down;
   in response to determining that the data processing resources can be dynamically scaled up, splitting one or more operators in accordance with the hints identified in the source code to be processed on two or more parallel processing resources; and
   in response to determining that the data processing resources can be dynamically scaled down, combining two or more operators in accordance with the explicit hints identified in the source code to be processed on a single parallel processing resource.

2. The method of claim 1, wherein splitting one or more operators includes cloning an operator to deploy an identical code block to another processing resource.

3. The method of claim 1, wherein the method further comprises:
   analyzing source code of the plurality of operators to identify implicit hints describing whether an operator contains data structures, method parameters or other data that can be applied in a parallelization data processing environment.

4. The method of claim 1, wherein the period between re-evaluating performance metrics is variable and is based on one or more of: a period of time, and on a number of tuples processed by an operator.

5. The method of claim 1, wherein evaluating includes comparing the performance metrics to one or more threshold values.

* * * * *